United States Patent [19]

Stumpf

[11] Patent Number: 4,565,046
[45] Date of Patent: Jan. 21, 1986

[54] APPARATUS FOR MANUFACTURING POCKETED COIL SPRINGS

[75] Inventor: Walter Stumpf, Dunwoody, Ga.

[73] Assignee: Simmons U.S.A. Corporation, Atlanta, Ga.

[21] Appl. No.: 685,573

[22] Filed: Dec. 24, 1984

[51] Int. Cl.⁴ .................. B29C 65/08; B29C 65/18; B65B 9/08
[52] U.S. Cl. .......................... 53/114; 53/562; 53/373; 156/383; 156/553; 156/580.1; 156/583.1; 493/193; 493/209; 493/475
[58] Field of Search ............ 156/70, 73.1, 383, 380.6, 156/380.8, 553, 580.1, 580.2, 583.1, 515; 100/93 P, 208; 53/450, 114, 550, 562, 373; 493/193, 209, 308, 475, 479

[56] References Cited

U.S. PATENT DOCUMENTS

| 2,647,671 | 8/1953 | McInerney | 53/114 |
| 3,620,884 | 11/1971 | Peterson | 156/553 |
| 3,668,816 | 6/1972 | Thompson | 53/114 |
| 4,439,977 | 4/1984 | Stumpf | 53/114 |
| 4,512,136 | 4/1985 | Christine | 53/450 |

Primary Examiner—Michael Wityshyn
Attorney, Agent, or Firm—A. Thomas Kammer

[57] ABSTRACT

An apparatus for manufacturing pocketed coil springs is provided. The apparatus includes a pair of weld heads and an adjustment assembly for moving the heads longitudinally or transversely from each other. The relative position of the weld lines in a fabric passing beneath the heads can accordingly be set with precision. This is accomplished by rotating one of the heads about two axes, one extending through the head and a second axis extending parallel to the first at a selected distance therefrom.

7 Claims, 6 Drawing Figures

APPARATUS FOR MANUFACTURING POCKETED COIL SPRINGS

BACKGROUND OF THE INVENTION

1. Field of the invention.

The field of the invention relates to machinery for manufacturing pocketed coil springs as used in bedding and furniture.

2. Brief description of the prior art.

Assemblies of pocketed coil springs have been manufactured for a number of years. When employed as innerspring assemblies for mattresses and the like, they provide a comfortable sleeping or sitting surface. An example of such an innerspring construction is disclosed in U.S. Pat. No. 4,234,984. The patented construction includes a plurality of rows of pocketed coil springs connected to each other. The present invention is directed to an apparatus which manufactures such rows.

Prior to the introduction of ultrasonic bonding, a row of pocketed coil springs was manufactured by inserting compressed coil springs between opposed plies of a folded fabric strip and thereafter securing the plies transversely and longitudinally to form closed pockets. U.S. Pat. Nos. 1,733,660 and 1,813,993 disclose machines for forming pockets in this manner.

A relatively recent development has been the use of ultrasonically bondable pocketing material and equipment for thermally welding this material instead of sewing. Commonly assigned U.S. Pat. No. 4,439,977 is directed to an apparatus for thermally bonding plies of fabric together to form coil spring pockets. Means for compressing the springs and inserting them between the plies are also disclosed.

SUMMARY OF THE INVENTION

The present invention is directed to an improvement of the apparatus disclosed in U.S. Pat. No. 4,439,977

Innerspring constructions may be made from coil springs of any selected height or width. Cushions, for example, generally require shorter coil springs than mattresses. Relatively large diameter coil springs may be desirable under certain conditions for stability. In addition, savings in wire costs may be realized. The invention provides an apparatus which allows coil springs of a wide range of heights to be fed between adjacent fabric plies. In addition, it includes adjustment means for setting transverse closing means to a desired position, thereby enabling one to quickly and easily provide appropriately spaced sealing lines for any size sealing horns.

In a preferred embodiment of the invention, the transverse closing means include an ultrasonic sealing horn. Means are provided for rotating the horn about both its longitudinal axis and a second axis and a selected distance therefrom. The horn's position may accordingly be changed without altering its orientation with respect to the plies that pass thereunder.

DETAILED DESCRIPTION OF THE INVENTION

Figure 1:
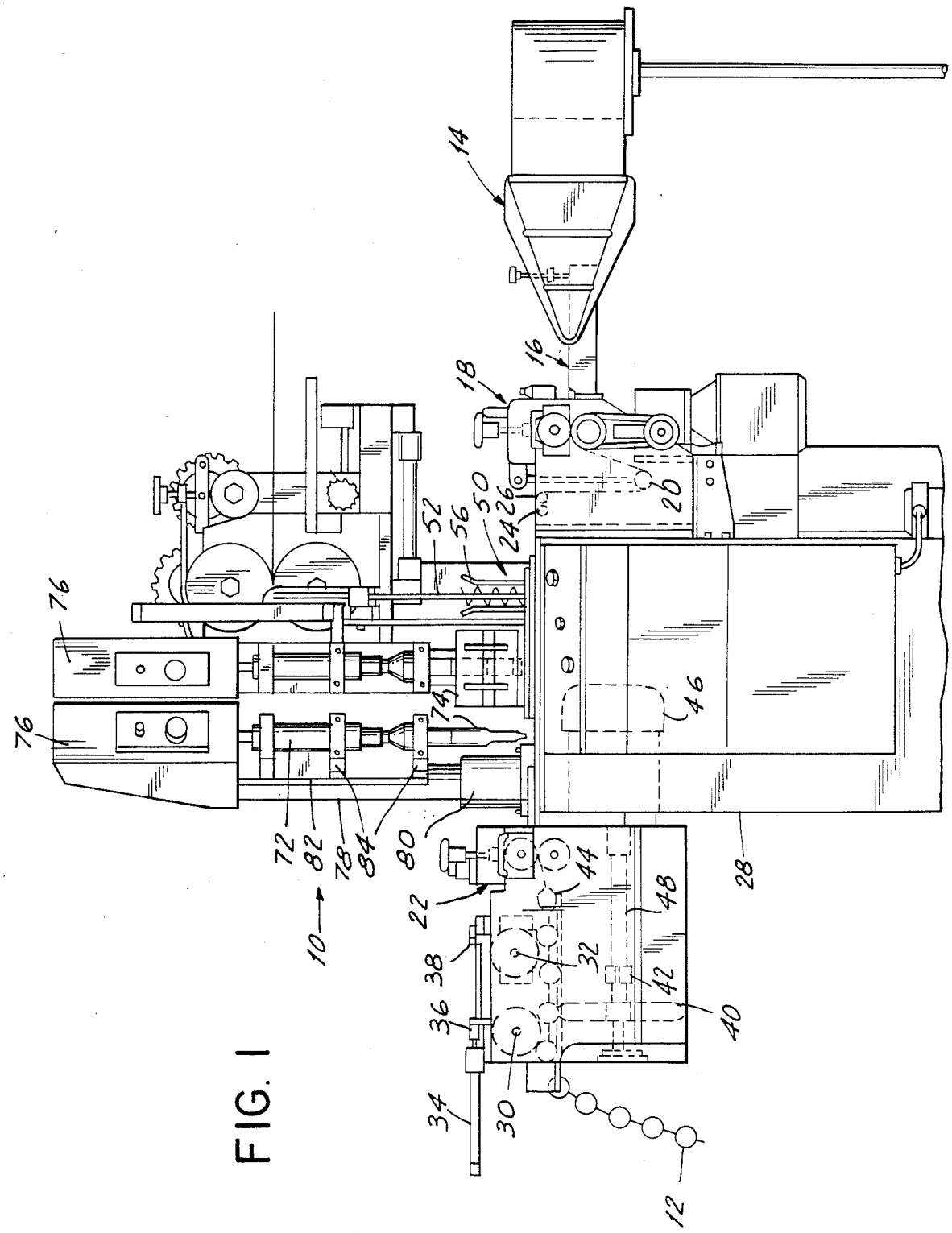
FIG. 1 is a front elevation view of an apparatus for manufacturing pocketed coil springs.
Figure 2:
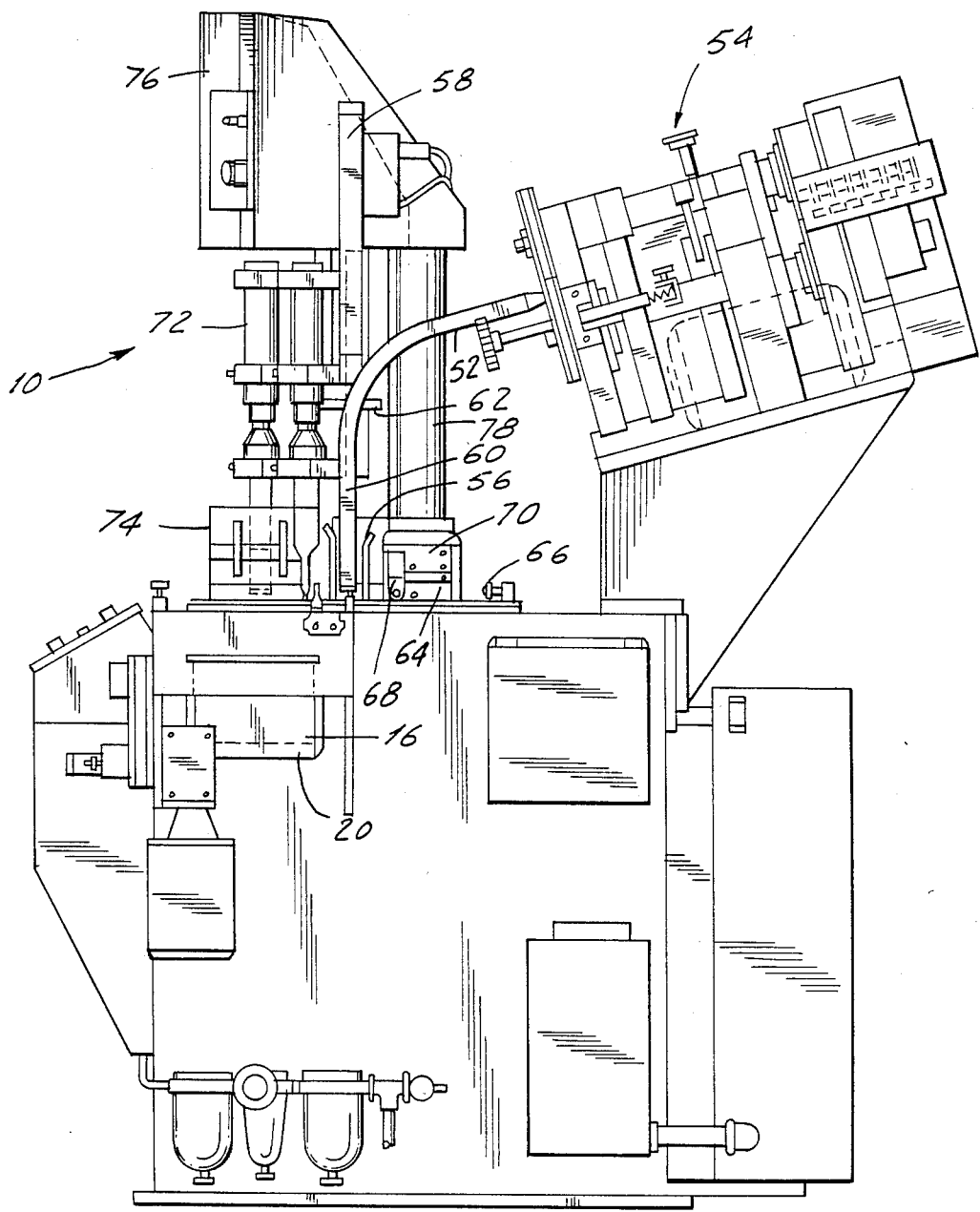
FIG. 2 is a side elevation view thereof.

An apparatus 10 for manufacturing pocketed coil springs 12 is shown in FIGS. 1-2. A similar apparatus is disclosed in commonly assigned U.S. Pat. No. 4,439,977 which is incorporated by reference herein.

The apparatus 10 is supplied with fabric from a folder 14. The fabric 16 is folded along its longitudinal center line and is fed through a feed roll assembly 18 which pulls it through the folder. It then extends around a tension roll 20. The tension roll bears against the fabric under the influence of gravity and maintains substantially constant fabric tension. This is important as the fabric is drawn intermittently through the guide path by an indexing roll assembly 22.

An additional pair of tension rolls 24,26 guide the fabric to a guide path defined by the upper surface of base frame 28. Intermittent fabric motion is accomplished by means of a conveyer assembly including sprocket shafts 30, 32, an air cylinder 34, pusher block 36, and bumper 38, all of which are fully explained in U.S. Pat. No. 4,439,977.

A pair of turner paddles 40, 42 underlying openings in a plate 44 are provided for turning the coil springs so that their axes are parallel to the transverse welds formed in the fabric. An electric motor 46 causes the paddles to rotate continuously by means of turn shaft 48.

A spring inserter assembly 50 is provided for inserting compressed coil springs between the plies of the folded fabric 16. The assembly includes a feed horn 52 for conveying springs from a coiler assembly 54 to the apparatus 10. The lower end of the horn terminates between a plurality of guide fingers 56 which maintain the spring in a centralized, upright position. A spring compressor including a double-acting cylinder 58, a guide bar 60, and a U-shaped compressor foot 62 is employed for compressing the spring along its longitudinal axis. A spring inserter plunger (not shown) pushes the compressed spring between the fabric plies. An inserter control switch 64 controls the operation of the plunger. A switch actuator 66 actuates the actuating arm 68 of an inserter safety switch 70 when the plunger is in its fully forward, spring inserting position. The switch shuts down the apparatus 10 if for some reason the plunger is prevented from moving forward to effect proper insertion of a compressed spring.

A pair of transducers 72 and ultrasonic horns 74 are mounted above the fabric guide path. They are axially movable by means of an air cylinder (not shown) within the housing 76 of each assembly. Each housing 76 is supported by a shaft 78 which is rotatable within a cylindrical collar 80. Each collar includes at least one threaded hole therein for retaining a set screw 81. The set screw prevents the shaft 78, and thereby the housing, transducer 72, and horn 74 from rotating about the axis of the shaft when the apparatus is in operation.

The transducer portion of each welding assembly is mounted to a backing plate 82 by one or more clamps 84. The clamps each include a U-shaped member 86 having a pair of holes 88 extending therethrough. These holes are aligned with corresponding holes in the U- shaped projections 90 extending from the backing plate. The clamps are tightened or loosened by turning set screw 92 within the holes.

The operation of the apparatus 10 is basically the same as that described in the aforementioned U.S. Pat. No. 4,439,977. The improvements herein are directed to the features which allow coil springs of various sizes and widths to be employed by making a few simple adjustments.

Pocket width may be adjusted in the patented assembly by varying the incremental rotational movement of a pair of indexing rolls and simultaneously adjusting the air pressure applied to a turner conveyor drive operating cylinder. The positions of the ultrasonic horns are not readily adjustable in this assembly, however.

Figure 3:
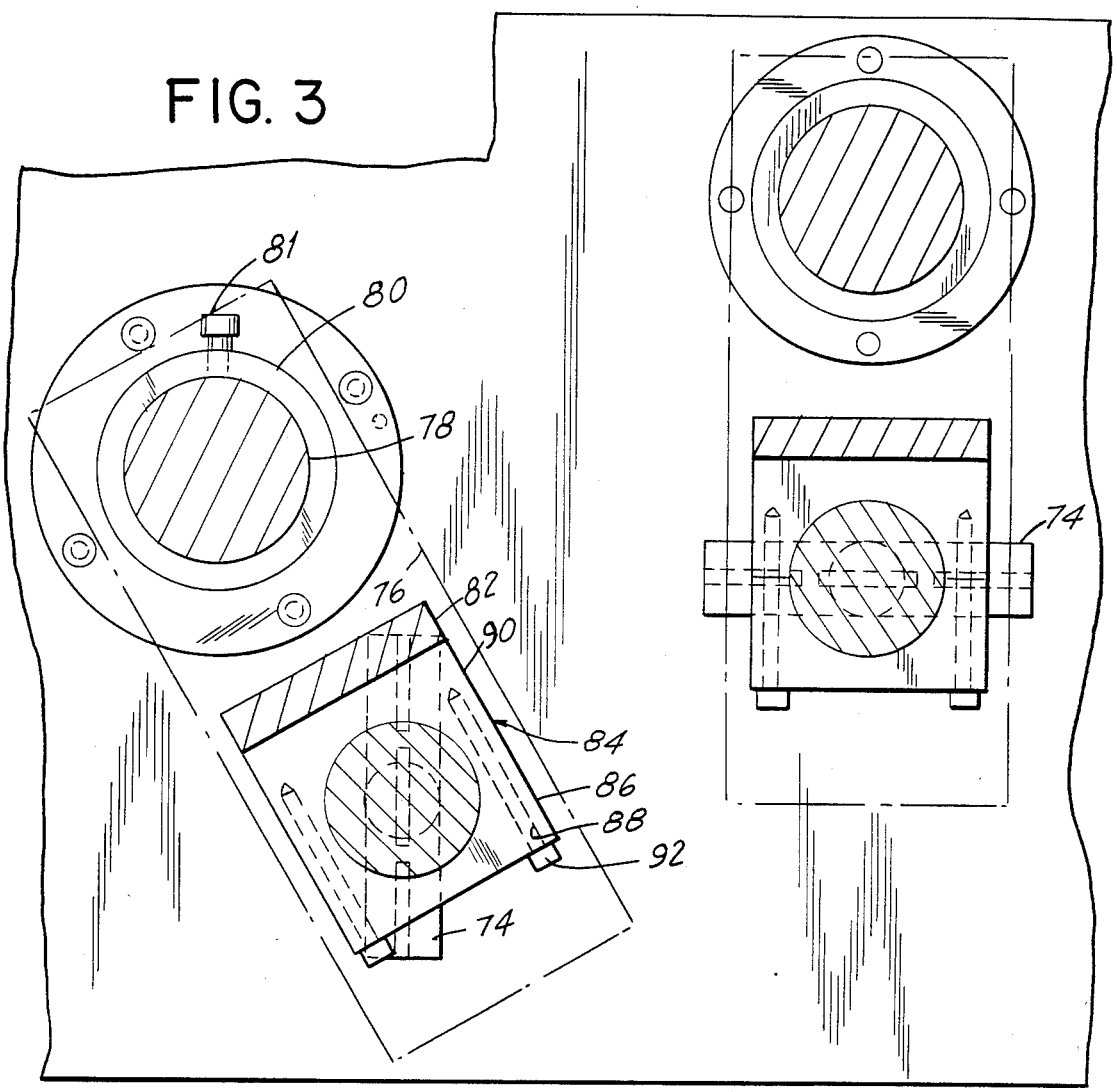
FIG. 3 is a sectional view thereof illustrating a weld head and a portion of the support therefor.
Figure 5:
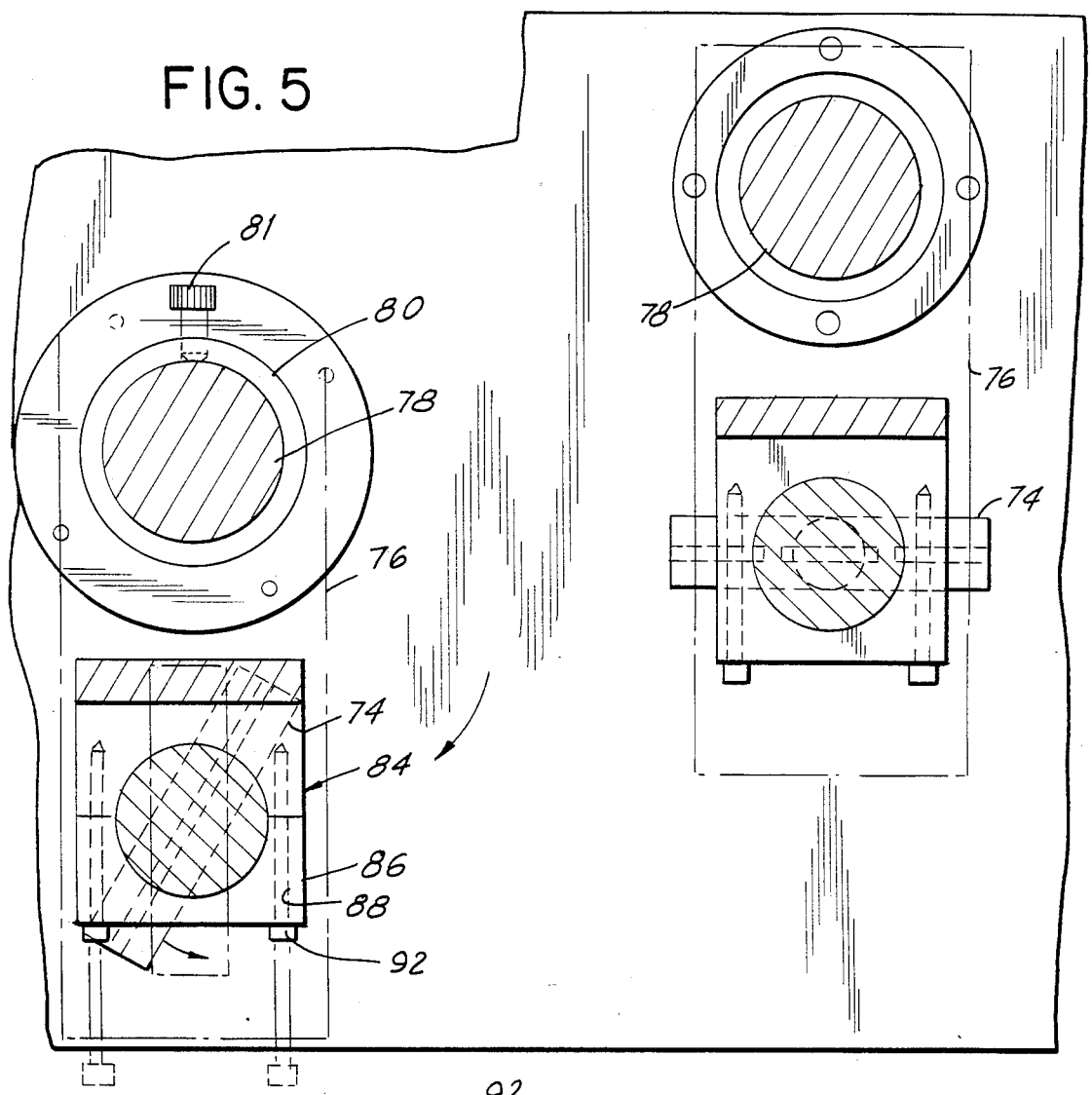
FIG. 5 is a sectional view illustrating one of the welding heads in a different position from that shown in FIGS. 1-3.

The present invention allows the position of horns 74 to be easily adjusted if pocket size is to be varied. If relatively small horns are to be utilized, they may be moved appropriately to provide properly spaced longitudinal and transverse welds. As shown in FIGS. 3 and 5, the horns are always positioned at right angles with respect to each other. By rotating the shaft 78 supporting the transverse horn towards the longitudinal horn (i.e. counterclockwise), the transverse weld will be formed closer to the longitudinal weld. The transverse horn is rotated in the opposite direction (i.e. clockwise) to maintain its perpendicularity with respect to the other horn.

The first rotational movement is accomplished by withdrawing the set screw 81 within collar 80 to allow the shaft 78 therein to be rotated in the desired direction. The set screws 92 within the clamps 84 are then loosened to allow the transducer/horn assembly to be rotated in the opposite direction. When the horn is properly oriented, all of the set screws are tightened.

The versatility of the apparatus is enhanced by providing a feed horn 52 of the size and shape shown in FIG. 2. Both the bottom and top portions of the horn 52 are relatively long and straight while the central portion is gently curved. This allows relatively long unstressed coil springs to be fed to the inserter assembly 50 without difficulty.

Figure 4:
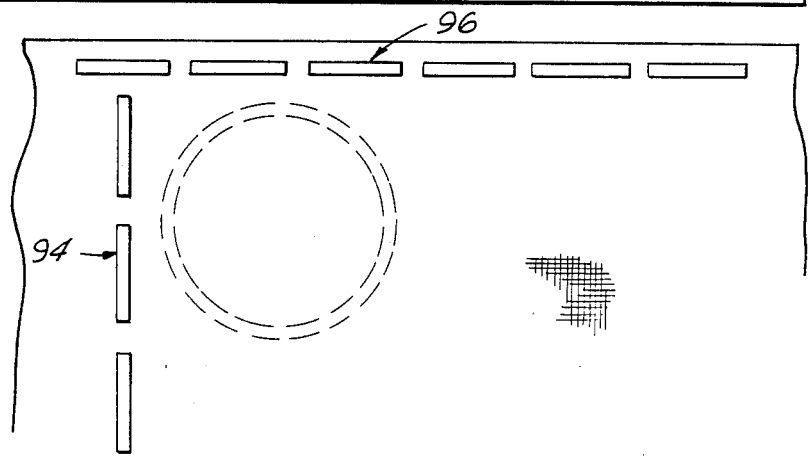
FIG. 4 is a top plan view of a fabric strip welded by the apparatus shown in FIGS. 1-3.
Figure 6:
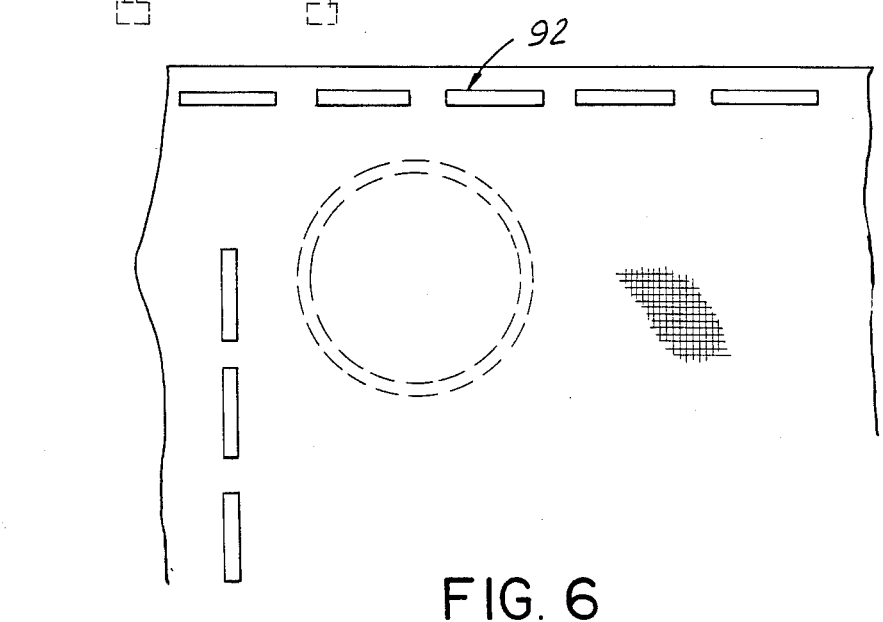
FIG. 6 is a top plan view of a fabric strip welded by the apparatus as shown in FIG. 5.

FIGS. 4 and 6 illustrate the difference in the welding patterns produced when the transverse ultrasonic horn is shifted relative to the longitudinal one. The transverse line 94 is shifted to the left and away from the longitudinal weld line 96 in FIG. 6 from the position shown in FIG. 4. The weld lines are interrupted as the anvils (not shown) beneath the horns have segmented or interrupted surfaces which bear against the fabric.

What is claimed is:

1. An apparatus for making a series of pocketed coil springs comprising:
    means defining a guide path for receiving a fabric strip for longitudinal movement therealong;
    drive means for advancing a fabric strip intermittently along said guide path;
    inserter means adjacent said guide path for depositing a compressed coil spring between plies of a fabric strip;
    first weld head means operatively associated with said guide path means for thermally welding said plies together along a weld line extending in the longitudinal direction;
    second weld head means operatively associated with said guide path means for thermally welding said plies together along a weld line extending transversely of a longitudinally moving strip;
    the improvement comprising means for rotating one of said weld head means about a first axis, means for rotating said one of said weld head means about a second axis parallel to and located a selected distance from said first axis, whereby the distance between said first and second weld head means can be varied while their orientation with respect to said guide path means remains the same.

2. An apparatus as defined in claim 1 wherein said one of said weld head means is said second weld head means.

3. An apparatus as defined in claim 2 wherein said first axis extends through said second weld head means.

4. An apparatus as defined in claim 3 including mounting means for holding said second weld head means in position, said mounting means including a clamp within which a portion of said second weld head means is rotatably positioned, and means for adjusting said clamp.

5. An apparatus as defined in claim 4 including a support, said clamp being secured to said support, and means for rotating said support about said second axis.

6. An apparatus as defined in claim 5 wherein said support includes a cylindrical column having a longitudinal axis coincident with said second axis.

7. An apparatus as defined in claim 6 including a collar within which said column is rotatably positioned, and means for securing said column in a fixed position within said collar.

* * * * *